Feb. 12, 1963 W. W. SHEPHERD 3,077,356
TRANSPORTER FOR EARTH MOVER
Filed Feb. 3, 1958
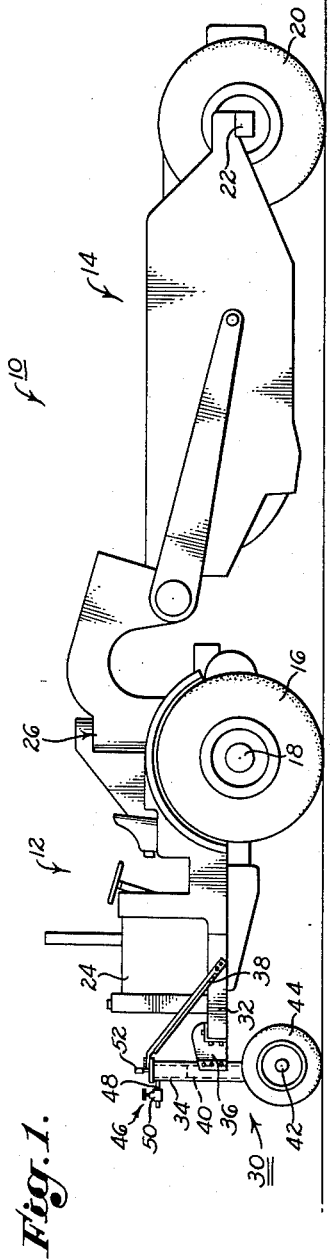
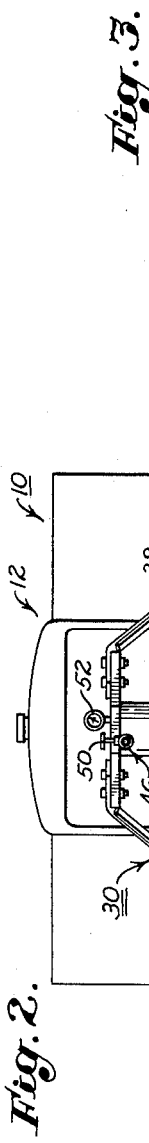
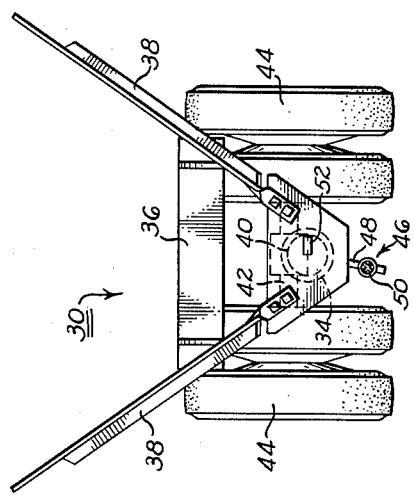
INVENTOR.
WILLARD W. SHEPHERD
BY HIS ATTORNEYS.
HARRIS, KIECH, FOSTER & HARRIS 3,077,356
TRANSPORTER FOR EARTH MOVER
Willard W. Shepherd, Whittier, Calif., assignor to Shepherd Machinery Co., a limited partnership
Filed Feb. 3, 1958, Ser. No. 712,966
5 Claims. (Cl. 280—405)

The present invention relates in general to vehicles and, more particularly, to means for reducing the axle loading of vehicles. Since the invention was originally embodied in and is particularly applicable to an apparatus for deducing the axle loading of earth moving equipment, such an application of the invention will be considered herein as a matter of convenience.

As general background, the present invention is of particular utility as applied to a two-axle earth mover of the type which includes a two-wheeled tractor and a trailing, two-wheeled scraper. The tractor wheels are mounted on a tractor axle adjacent the rear of the tractor and the scraper wheels are mounted on a scraper axle adjacent the rear of the scraper, it being understood that the term "axle," as used herein, may refer either to a single axle, or to axially-aligned stub axles. In such an earth mover, the tractor is pivoted relative to the scraper for steering purposes about an upright pivot axis located adjacent the tractor axle. Earth movers of this general type are well known, examples thereof being found in Patent No. 2,368,202, granted January 30, 1945 to Gerald I Clark and in Patents Nos. 2,532,785 and 2,532,786, both issued on December 5, 1950 to John E. Richter. Consequently, such an earth mover need not be considered in detail herein.

The axle loadings, and particularly the tractor axle loading, of an earth mover of the foregoing nature frequently exceed the legal maximums permitted by various states of the United States. As an example, for long-haul, self-powered transport for distances exceeding 50 miles in the state of California, the California State Highway Department at the present time limits single-axle loading to 24,000 pounds over so-called "Green" bridges. In many instances, the tractor axle loading of earth movers utilized in California exceeds 24,000 pounds so that such earth movers frequently cannot be operated on state highways, similar conditions prevailing elsewhere. Obviously, restrictions of this nature on highway travel create transportation problems.

A primary object of the present invention is to provide an apparatus for reducing the maximum axle loading of such an earth mover to an acceptably low value for highway transportation purposes, or other purposes.

An important object of the invention is to provide an apparatus for reducing axle loadings having the form of an attachment which may be installed on the earth mover readily when minimum axle loadings are necessary, and which may be removed readily when normal axle loadings are desired during earth-moving operations.

More particularly, an important object of the invention is to provide an attachment comprising a frame, an auxiliary axle carried by the frame and provided with at least one ground-engageable wheel, and mounting means for detachably connecting the frame to the tractor forwardly of the tractor axle with the wheel on the auxiliary axle in engagement with the ground, thereby reducing the axle load of the tractor axle.

Another object is to provide a frame which includes relatively vertically movable, upper and lower frame sections, the upper frame section being detachably connected to the tractor and the auxiliary axle being carried by the lower frame section, the invention providing means for moving the lower frame section downwardly relative to the upper frame section so as to increase the loading of the auxiliary axle and thus decrease the loading of the tractor axle.

Another object of the invention is to provide an attachment of the foregoing nature wherein the upper frame section comprises a large upright cylinder detachably mounted on the tractor adjacent the front thereof and the lower frame section comprises a piston reciprocable in such cylinder and carrying the auxiliary axle, means for pressurizing the cylinder above the piston being provided so as to transfer part of the weight of the tractor axle to the auxiliary axle, thereby reducing the weight carried by the tractor axle.

Another object is to provide a pressure gauge communicating with the cylinder above the piston and calibrated in terms of the weight carried by the auxiliary axle. With this construction, it is possible to determine at a glance the auxiliary axle loading, and thus the loading of the tractor axle.

The foregoing objects, advantages, features and results of the present invention, together with various other objects, advantages, features and results thereof which will be evident to those skilled in this art in the light of the present disclosure, may be attained with the exemplary embodiment of the invention described in detail hereinafter and illustrated in the accompanying drawing, in which:

FIG. 1 is a side elevational view of an earth mover equipped with the axle-loading-reducing attachment of the invention;

FIG. 2 is a front elevational view of the attachment of the invention on an enlarged scale; and FIG. 3 is a plan view of the attachment on an enlarged scale.

In the drawing, the numeral 10 designates an earth mover of the character hereinbefore outlined, such earth mover including a tractor 12 and a trailing scraper 14. The tractor 12 is provided with two transversely spaced wheels 16 mounted on a transverse tractor axle 18 located adjacent the rear of the tractor 12. Similarly, the scraper 14 is provided with two transversely spaced wheels 20 carried by a transverse scraper axle 22 located adjacent the rear of the scraper. The earth mover 10 is propelled by an engine or motor 24 mounted on the tractor 12 adjacent the front thereof and connected to the tractor wheels 16 in a conventional manner. Steering of the earth mover 10 is effected by pivoting the tractor 12 relative to the scraper 14 about an upright pivot axis provided by a pivot means 26 located adjacent the tractor axle 18.

The present invention comprises an attachment 30 adapted to be detachably mounted on the frame 32 of the tractor 12 adjacent the front of the tractor and adapted to reduce the proportion of the weight of the earth mover 10 which is carried by the tractor wheels 16. The attachment 30 includes a large upright cylinder or cylinder member 34 equipped intermediate its ends with a bracket 36 which is detachably connectible to the tractor frame 32, as by means of bolts, or the like. The cylinder 34 may be braced by means of inclined braces 38 connected to the upper end of the cylinder, which is closed as clearly shown in FIGS. 2 and 3, and detachably connectible at their rearward, lower ends to the tractor frame 32, as by means of bolts, for example.

Disposed in the cylinder 34 is a piston or piston member 40 which is provided at its lower end with a transverse, auxiliary axle 42 carrying auxiliary wheels 44. The attachment 30 is shown as including four auxiliary wheels 44, but it will be understood that this number may be varied without departing from the spirit of the invention. The piston 40 is rotatable in the cylinder 34 to permit the assembly of auxiliary wheels to caster when the earth mover 10 is in motion with the attachment 30 thereon. Thus, the presence of the attachment 30 on the earth mover 10 does not affect the normal steering of the earth mover 10.

The attachment 30 includes means 46 for pressurizing the cylinder 34 above the piston 40, such pressurizing resulting in downward displacement of the piston to transfer part of the weight of the earth mover 10 to the auxiliary axle 42. Preferably, the cylinder 34 is pressurized with a compressible fluid, such as air, to permit vertical movement of the piston 40 so as to compensate for ground irregularities, the escape of air past the piston being prevented by an oil seal comprising oil in the cylinder above the piston. The attachment of the invention thus acts as a sealed accumulator or strut which provides relatively constant auxiliary support over uneven terrain. In the particular construction illustrated, the pressurizing means 46 is shown as being simply an air inlet fitting 48 equipped with a valve 50 to prevent the escape of air after pressurizing.

The attachment 30 includes a pressure gauge 52 in communication with the cylinder 34 above the piston 40. Preferably, this pressure gauge is calibrated in terms of the weight carried by the auxiliary axle 42, although it may also be calibrated in pounds per square inch. Providing the pressure gauge 52 with a calibration in terms of the load on the auxiliary axle 42 permits a direct determination of the load on the auxiliary axle, and thus facilitates a determination of the load on the tractor axle 18.

Considering the case of an earth mover 10 having a total weight of 59,500 pounds, by pressurizing the cylinder 34 to provide an axle loading on the auxiliary axle 42 of 13,500 pounds, the axle loadings of the tractor axle 18 and the scraper axle 22 may be reduced to 23,000 pounds each. It will be apparent that, with this example, the axle loadings are all less than the maximum permissible axle loading of 24,000 pounds hereinbefore discussed in the California example.

It will be understood that applying some of the weight of the earth mover 10 to the auxiliary axle 42 results in changing the axle loadings for both the tractor axle 18 and the scraper axle 22 since the entire earth mover 10 is effectively a rigid beam in a vertical plane, but the primary effect of carrying part of the weight on the auxiliary axle 42 is to reduce the weight carried by the tractor axle 18.

It is thought that the operation of the invention is more or less self-evident so that only a brief description will be necessary. When the earth mover 10 is in use to perform its earth moving function, the attachment 30 is not used, thereby providing a maximum axle loading on the tractor axle 18 for maximum traction. However, when it is desired to transport the earth mover 10 under conditions where reduced axle loadings are necessary, or desirable, the attachment 30 is mounted on the tractor 12, this requiring but a few minutes' time with the bolted connections mentioned. The cylinder 34 is then pressurized to transfer part of the weight of the earth mover 10 to the auxiliary axle 42, the pressure gauge 52 providing a direct indication of the load carried by the auxiliary axle. Thereafter, the earth mover is transported by self-propulsion, the presence of the attachment 30 having no effect on normal steering of the earth mover due to the castering action of the assembly of wheels 44.

Although an exemplary embodiment of the invention has been disclosed herein for purposes of illustration, it will be understood that various changes, modifications and substitutions may be incorporated in such embodiment without departing from the spirit of the invention as defined by the claims which follow:

What is claimed is:

1. In an attachment for reducing the axle loading of a two-axle vehicle which includes a tractor and a trailer, the vehicle including means connecting the forward end of the trailer to the rearward end of the tractor, the tractor and the trailer having adjacent their respective rearward ends tractor and trailer axles each provided with ground-engaging wheels, said attachment including: a sealed, self-contained, telescoping pneumatic strut comprising a cylinder member having a closed end and a piston member within said cylinder member, said cylinder and piston members being relatively reciprocable along the common axis thereof and being relatively rotatable abount said axis; mounting means for rigidly connecting one of said members to the tractor adjacent the forward end of the tractor and forwardly of the tractor axle with said members in an upright position; an auxiliary axle carried by the other of said members and provided with at least one ground-engageable wheel; and means for pressurizing said cylinder member with compressed gas between said closed end thereof and said piston member to cause said other member to move downwardly to engage said wheel on said auxiliary axle with the ground, whereby to cause said auxiliary axle to carry part of the weight of the vehicle, said pressurizing means including gas inlet means communicating with said cylinder member between said closed end thereof and said piston member and including valve means for opening and closing said gas inlet means.

2. An attachment according to claim 1 including a pressure gauge communicating with said cylinder member between said closed end thereof and said piston member.

3. An attachment according to claim 1 including a pressure gauge communicating with said cylinder member between said closed end thereof and said piston member, said pressure gauge being calibrated in terms of the load on said auxiliary axle.

4. An attachment according to claim 1 wherein said one member is said cylinder member and said other member is said piston member, said attachment including liquid in said cylinder member between said closed end thereof and said piston member and providing a liquid seal between said cylinder and piston members.

5. In an attachment for reducing the axle loading of a vehicle which includes two longitudinally spaced, transverse axles each provided with ground-engaging wheels, the combination of: a sealed, self-contained, telescoping pneumatic strut comprising a cylinder member having a closed end and a piston member within said cylinder member, said cylinder and piston members being relatively reciprocable along the common axis thereof and being relatively rotatable about said axis; mounting means for rigidly connecting one of said members to the vehicle adjacent one end of the vehicle and outside of the space between the axles of the vehicle and with said members in an upright position; an auxiliary axle carried by the other of said members and provided with at least one ground-engageable wheel; and means for pressurizing said cylinder member with compressed gas between said closed end thereof and said piston member to cause said other member to move downwardly to engage said wheel on said auxiliary axle with the ground, whereby to cause said auxiliary axle to carry part of the weight of the vehicle, said pressurizing means including gas inlet means communicating with said cylinder member between said closed end thereof and said piston member and including valve means for opening and closing said gas inlet means.

References Cited in the file of this patent

UNITED STATES PATENTS

| | | |
|---|---|---|
| 1,398,683 | Dubois | Nov. 29, 1921 |
| 1,977,833 | Mortensen et al. | Oct. 23, 1934 |
| 2,142,216 | Seyferth | Jan. 3, 1939 |
| 2,463,746 | Conley et al. | Mar. 8, 1949 |
| 2,891,331 | Pleska | June 23, 1959 |

FOREIGN PATENTS

| | | |
|---|---|---|
| 668,250 | Great Britain | Mar. 12, 1952 |

OTHER REFERENCES

Engineering New-Record (vol. 159 #8), "New Products" section, pg. 75.